United States Patent [19]

Spitz

[11] Patent Number: 4,971,780
[45] Date of Patent: Nov. 20, 1990

[54] PROCESS FOR THE RECLAMATION OF BATTERY ACID AND FLUID FROM EXPENDED LEAD-ACID BATTERIES

[75] Inventor: Robert A. Spitz, Holbrook, Mass.

[73] Assignee: East Penn Manufacturing Co., Inc., Lyon Station, Pa.

[21] Appl. No.: 312,429

[22] Filed: Feb. 17, 1989

Related U.S. Application Data

[63] Continuation-in-part of Ser. No. 133,132, Dec. 14, 1987, abandoned.

[51] Int. Cl.$^5$ ............ C01B 17/90; B01D 11/00; H01M 6/50; H01M 10/42
[52] U.S. Cl. .................. 423/531; 423/139; 423/DIG. 2; 429/49
[58] Field of Search .......... 423/522, 531, DIG. 2, 423/89, 139; 429/49

[56] References Cited

U.S. PATENT DOCUMENTS

| | | | |
|---|---|---|---|
| 3,637,711 | 1/1977 | Budde, Jr. et al. | 260/289 |
| 3,841,916 | 10/1974 | Marchetti | 429/49 |
| 4,061,564 | 12/1977 | De Schepper et al. | 423/87 |
| 4,067,802 | 1/1978 | Cronberg et al. | 210/21 |
| 4,082,832 | 4/1978 | Watanabe et al. | 423/531 |
| 4,102,976 | 7/1978 | Hiemeleers et al. | 423/87 |
| 4,444,666 | 4/1984 | Sato | 210/670 |
| 4,499,058 | 2/1985 | Fitoussi et al. | 423/522 |
| 4,501,666 | 2/1985 | Ogata et al. | 423/87 |
| 4,559,216 | 12/1985 | Nagai et al. | 423/139 |
| 4,582,691 | 4/1986 | Fujimoto et al. | 423/139 |
| 4,628,011 | 12/1986 | Feldman et al. | 429/49 |

FOREIGN PATENT DOCUMENTS

| | | | |
|---|---|---|---|
| 2515862 | 10/1976 | Fed. Rep. of Germany | 423/87 |
| 56-160326 | 12/1981 | Japan | 423/531 |
| 59-162138 | 9/1984 | Japan | 423/87 |
| 452542 | 6/1976 | U.S.S.R. | 423/87 |

OTHER PUBLICATIONS

Yukhim et al, Separation of Antimony & Arsenic by Extraction with Di 2 Ethyl Hexyl Dithiophosphoric Acid, Plenum Publishing Corp., 1980.

G. P. Demopoulos and D. L. Gefvert, "Iron(III) Removal from Base-Metal Electrolyte Solutions by Solvent Extraction," 12 *Hydrometallurgy* 299 (1984).

*Primary Examiner*—Gary P. Straub
*Attorney, Agent, or Firm*—Ferrill and Logan

[57] ABSTRACT

The present invention discloses a process of extraction and filtration for removing metallic impurities from the acid in used lead-acid batteries. Produced is a reclaimed battery acid fluid which performs very well in new batteries and which avoids the severe costs and environmental risks entailed in present methods of battery acid fluid disposal.

21 Claims, No Drawings

PROCESS FOR THE RECLAMATION OF BATTERY ACID AND FLUID FROM EXPENDED LEAD-ACID BATTERIES

This application is a continuation-in-part of application 133,132 filed 14 Dec. 1987 now abandoned.

BACKGROUND OF THE INVENTION

1. Field of the Invention

The Present invention relates to a method of removing contaminating impurities from used battery acid fluid so to permit the fluid to be used in new batteries or concentrated for sale. More specifically, the method employs a series of filtration and extraction steps to regenerate used battery acid fluid by removing diluting contaminants, including iron and antimony.

2. Description of the Prior Art

A serious problem, both economically and environmentally, in the manufacture and sale of lead-acid batteries is how to handle and dispose of contaminated battery acid fluid contained in discarded batteries. Until relatively recent environmental regulations ended the practice, this waste, comprising sulfuric acid ($H_2SO_4$) diluted with various metal and non-meta contaminants, traditionally has been dumped in landfills or flushed into public sewers. The advent of severe pollution Penalties has ended this practice, but, until now, no reasonable alternative plan of disposal has been developed.

Presently, battery acid fluid from trade-in batteries is handled in a number of less than ideal manners. Some manufacturers have found an outlet through industries with demand for dilute sulfuric acid. However, this places the battery manufacturers at the mercy of the demands of other markets, and presents a whole host of problems when faced with the advent of cradle-to-grave environmental laws. Other manufacturers have paid to have the battery acid fluid neutralized and then disposed of in certain restricted landfills. This can be very expensive and is needlessly wasteful.

In the course of developing the present invention, the inventor encountered a number of proposals for reclamation of battery acid fluid. One solution proposed was distilling the sulfuric acid via indirect heat in closed vessels under vacuum. This was dismissed as unreasonable in light of high energy costs, high investment costs, serious corrosion and disposal Problems, and environmental concerns. Another solution proposed was acid retardation in the form of an ion exchange process entailing passing a strong acid feed through a strong base ion exchange resin. Once again this proposal proved unreasonably expensive in investment and development costs. A further proposal was to remove contaminants through electrolytic processing. Despite early promising results using this method, further tests demonstrated that iron removal was insufficient for commercial purposes.

In light of the foregoing, it is a primary object of the present invention to avoid the waste and expense of disposal of contaminated battery acid fluid by providing a method of reclaiming contaminated battery acid fluid for use in new batteries or for concentration for resale.

Another object of the present invention is to provide a method of battery acid fluid reclamation which is commercially practical, requires minimal capital investment, is relatively inexpensive to operate, and minimizes environmental risk.

SUMMARY OF THE INVENTION

The present invention employs extraction and filtration steps to remove disabling metallic impurities, including iron and antimony, from used lead-acid battery acid fluid. Use of the present invention eliminates a serious environmental disposal problem, and produces a reclaimed battery acid fluid which performs as well as fresh battery acid fluid.

The present invention employs an extraction agent comprising a mixture of a chelating agent, such as a derivative of an 8-hydroxyquinoline, an organophosphoric acid, a modifier, and a hydrocarbon carrier solution. Using multiple extraction steps, the extraction agent is mixed with contaminated battery acid fluid (diluted with distilled water or dilute sulfuric acid water) to remove the metallic impurities. The extracted battery acid fluid is then filtered through a carbon filter to remove residual organics. The metallic impurities are subsequently removed from the extraction agent in a concentrated form.

Through concentration or the addition of fresh sulfuric acid to overcome the water dilution, the reclaimed battery acid fluid may be placed in new lead-acid batteries. Tests reveal that this process produces a battery acid fluid which performs as well as fresh battery acid fluid, but is free of the costs and environmental risks of disposing of used battery acid fluid.

DETAILED DESCRIPTION OF THE INVENTION

The present invention provides a method of processing contaminated battery acid fluid into reclaimed battery acid fluid through use of liquid-liquid extraction and filtration.

Battery acid fluid removed from used lead-acid type batteries comprises approximately 25% (1.18 specific gravity) sulfuric acid ($H_2SO_4$) diluted with various metallic impurities, including iron (about 40–150 ppm), antimony (about 5–30 ppm), lead (about 2–10 ppm), arsenic (about 1 ppm), copper (about 2–15 ppm), cadmium (about 5–20 ppm), and nickel (about 1 ppm). The presence of iron at any level above 20 ppm effectively bars use of the battery acid fluid. In fact, United States government federal specifications (Federal Spec. O-S-801C-Class III) requires iron concentration to be less than 20 ppm.

In the process of removing these impurities using the present invention, the contaminated battery acid fluid is first filtered through a conventional filter to remove suspended Particle matter. Commercially available hydrolytic polypropylene filters have proven effective for this purpose.

According to the work by Demopoulous and Gefvert reported in "Iron(III) Removal from Base-Metal Electrolyte Solutions By Solvent Extraction," 12 *Hydrometallurgy* 299, 303 (1984), iron removal via extraction from an electrolytic solution is maximized in the area of 150 to 180 grams per liter (g/l) of $H_2SO_4$. Accordingly, the present process is believed to function best at similar dilute concentrations of sulfuric acid. To achieve this level, distilled water or dilute sulfuric acid water is added to reduce the sulfuric acid content to approximately 15% (1.102 specific gravity).

Although operating at levels of sulfuric acid above 180 grams per liter is somewhat less efficient, it has been found that the present invention functions quite adequately at sulfuric acid concentrations of 200 grams per liter and up to a level of 230 grams per liter. Above this level the efficiency of the extraction agent is too low to be effective. Accordingly, it is preferred that dilution should be performed to a level of between 150 and 230 grams per liter. Within this range exact dilution level is more of a function of operational considerations of the entire reclaiming operation than of the efficiency of extraction.

Although battery acid fluid normally contains iron in its ferric (Fe III) form, it has been found that satisfactory extraction using the present invention will not occur if the iron is in a ferrous form. Accordingly, if a substantial quantity of ferrous iron is present, the fluid should be oxidized using conventional methods, such as blowing it with air or adding peroxide, to form ferric iron prior to extraction.

Liquid-liquid extraction is then performed on the contaminated battery acid fluid. The extraction agent employed is a mixture of a chelating agent, an organophosphoric acid, and a modifier, all dissolved in a water immiscible carrier. Use of such a compound for extraction of high concentrations of metals from electrolyte solution is disclosed in U.S. Pat. 4,067,802.

Specifically, the chelating agent employed is an 8-hydroxyquinoline substituted in the No. 7 position with a long chain aliphatic hydrocarbon radical ("8-hydroxyquinoline derivative"), and particularly a 7-[3-(5,5,7,7-tetramethyl-1-octenyl)] -8-hydroxyquinoline. This is commercially available under the trademark KELEX 100 produced by SHEREX Chemical Co., Inc. The organophosphoric acid is preferably a mono- or dialkyl phosphoric acid, such as a di-2-ethylhexyl phosphoric acid ("DEHPA"). The respective 8-hydroxyquinoline derivative and the organophosphoric acid are mixed at a molar ratio between 1:1 to 1:4. The modifier serves to maintain the solubility of the extraction agent in the carrier and enhances the phase disengagement. It may be either alkyl phosphates or high molecular weight alcohols. Tridecanol is preferred.

As is disclosed in U.S. Pat. 4,067,802, the water immiscible carrier should be a hydrocarbon solvent which dissolves both the chelating agent and the phosphoric acid and should be chemically stable, low in toxicity, and have a high flash point. Preferred is odorless mineral spirits.

A mixture containing 30% extraction agent and 70% mineral spirits typically comprises 6.8 volume % (within a range of 5 to 10%) of 8-hydroxyquinoline derivative, 12.4 volume % (within a range of 10 to 15%) DEHPA, and 10.8 volume % (within a range of 5 to 15%) tridecanol. The ratio of extraction agent to mineral spirits may range from 5:95 to 50:50.

The extraction mixture is then mixed with the diluted contaminated battery acid fluid in ratios ranging from 4:1 to 1:4. The preferred mixture is at a ratio of about 1:1 with the use of multiple extraction steps, where necessary.

Once the respective iron and antimony contents are brought to levels of 20 ppm and 0.5 ppm, the extracted battery acid fluid is then passed through a polish filter which comprises a granular or powdered activated carbon filter, such as a packed column or flat bed filter unit. Activated carbon sold under the trademark NUCHAR SA by Westvaco has proven effective in removing both organics and some metallic impurities. This removes unwanted organic impurities from the solution, such as residual extraction agent, and produces the reclaimed battery acid fluid. When the flow from the carbon filter is no longer clear, the carbon is replaced.

Finally, the 15% acid may be concentrated under vacuum by heating, or concentrated sulfuric acid may be added to the reclaimed battery acid fluid, to return the fluid to approximately 35% sulfuric acid (1.265 specific gravity). The reclaimed battery acid fluid may then be placed in new batteries.

The above process may be run relatively rapidly—processing contaminated battery acid fluid at a rate of 20 gallons per minute.

As the following examples of this process demonstrate, the Present invention performs exceptionally well.

EXAMPLE 1

A contaminated battery acid fluid was tested consisting of:

| Component | Amount |
|---|---|
| $H_2SO_4$ | 25% |
| Fe | 185 ppm |
| Sb | 20 ppm |
| Pb | <2 ppm |
| As | 3 ppm |
| Cu | 10 ppm |
| Ni | <2 ppm |
| Cd | 20 ppm |

The contaminated battery acid fluid was diluted using distilled water to a level of 15% $H_2SO_4$. It was then extracted using an extraction agent of 6.8% KELEX 100, 12.4% DEHPA, 10.8% tridecanol, and 70% odorless mineral spirits. The mixture was at a volumetric ratio of 1:1 battery acid fluid to extraction mixture. Three separate extractions were performed.

The extracted battery acid fluid was then passed through a packed bed of activated carbon (NUCHAR SA). Finally, sulfuric acid was added to bring the fluid back to the desired acid concentration. The resulting reclaimed battery acid fluid consisted of:

| Component | Amount |
|---|---|
| $H_2SO_4$ | 30% |
| Fe | 20 ppm |
| Sb | 6 ppm |
| Pb | <2 ppm |
| As | 3 ppm |
| Cu | 6 ppm |
| Ni | <2 ppm |
| Cd | 9 ppm |

This fluid was tested against control batteries containing fresh sulfuric acid, a solution of fresh sulfuric acid solution diluted with contaminated battery acid, and a solution of contaminated battery acid fluid passed through a NUCHAR SA carbon filter.

The results revealed that the present invention produced a battery acid fluid which Performed as well as the fresh fluid in every respect, including cold cranking power, reserve capacity, charge rate acceptance, shelf life, "gassing," and performance drop. In each case, the other batteries performed significantly less effectively and had a current acceptance much less than the battery produced using the present invention.

EXAMPLE 2

A contaminated battery acid fluid was tested consisting of:

| Component | Amount |
|---|---|
| $H_2SO_4$ | 25% |
| Fe | 63 ppm |
| Sb | 30 ppm |
| Pb | 3 ppm |
| As | 4 ppm |
| Cu | 16 ppm |
| Ni | 2 ppm |
| Cd | 12 ppm |

The contaminated battery acid fluid was diluted using distilled water to a level of 15% $H_2SO_4$. It was then extracted using an extraction agent of 6.8% KELEX 100, 12.4% DEPHA, 10.8% tridecanol, and 70% odorless mineral spirits. The mixture was at a volumetric ratio of 1:1 battery acid fluid to extraction mixture. Five separate extractions were performed.

The extracted battery acid fluid was then passed through a packed bed of activated carbon (NUCHAR SA). Finally, sulfuric acid was added to bring the fluid back to the desired acid concentration. The resulting reclaimed battery acid fluid consisted of:

| Component | Amount |
|---|---|
| $H_2SO_4$ | 30% |
| Fe | 6 ppm |
| Sb | 6 ppm |
| Pb | <2 ppm |
| As | 1 ppm |
| Cu | 3 ppm |
| Ni | <2 ppm |
| Cd | 4 ppm |

Although complete tests have not yet been completed on this sample, from prior experience with fluids containing comparable impurities, applicants expect this sample to perform at least as well as Example 1.

EXAMPLE 3

A further test was conducted employing a ratio of 20% extraction agent and 80% mineral spirits. This mixture proved to perform nearly as well as a mixture of 30% extraction agent and 70% mineral spirits. A mixture of 10% extraction agent and 90% mineral spirits proved to be ineffective.

EXAMPLE 4

A contaminated battery acid fluid was tested consisting of:

| Component | Amount |
|---|---|
| $H_2SO_4$ | 25% |
| Fe | 51.6 ppm |

The contaminated battery acid fluid was diluted using distilled water to a level of 16% $H_2SO_4$. It was then extracted using an extraction agent of 6.8% KELEX 100, 12.4% DEPHA, 10.8% tridecanol, and 70% odorless mineral spirits. The mixture was at a volumetric ratio of 1:1 battery acid fluid to extraction mixture. Five counter current extractions were performed.

The extracted battery acid fluid was then passed through a packed bed of activated carbon (NUCHAR SA). Finally, sulfuric acid was added to bring the fluid back to the desired acid concentration. The resulting reclaimed battery acid fluid consisted of:

| Component | Amount |
|---|---|
| $H_2SO_4$ | 32% |
| Fe | 9.0 ppm |

This fluid functioned as well as fresh sulfuric acid in every respect when packed in and tested in new batteries.

EXAMPLE 5

A contaminated battery acid fluid was tested consisting of:

| Component | Amount |
|---|---|
| $H_2SO_4$ | 27% |
| Fe | 60.6 ppm |

The contaminated battery acid fluid was diluted using distilled water to a level of 20% $H_2SO_4$. It was then extracted using an extraction agent of 6.8% KELEX 100, 12.4% DEPHA, 10.8% tridecanol, and 70% odorless mineral spirits. The mixture was at a volumetric ratio of 1:1 battery acid fluid to extraction mixture. Five counter current extractions were performed.

The extracted battery acid fluid was then passed through a packed bed of activated carbon (NUCHAR SA). Finally, sulfuric acid was added to bring the fluid back to the desired acid concentration. The resulting reclaimed battery acid fluid consisted of:

| Component | Amount |
|---|---|
| $H_2SO_4$ | 32% |
| Fe | 19.5 ppm |

This iron level meets specification and is expected to perform as well as fresh sulfuric acid.

The above examples reveal that the present invention eliminates the waste problem of disposing of contaminated battery acid fluid with no sacrifice in the quality of the batteries produced.

The amount of waste produced through use of the present invention is further reduced by reclaiming the extraction agent. Using a "strip acid," of a higher acidic content than the battery acid fluid, and a cross flow or counter current flow stripping process, the metal contaminants can be repeatedly removed from the extraction agent so that it can be reused indefinitely.

By repeatedly mixing the extraction agent with a strip acid of approximately 35% $H_2SO_4$ (within a range of 30 to 50% $H_2SO_4$), the metal contaminants will pass from the extraction agent to the strip acid. Waste is further lessened by repeatedly using the strip acid. Using either conventional cross flow or conventional counter current flow techniques, the strip acid may be used for multiple extraction steps: the purest strip acid is used to remove contaminants from the purest extraction agent, and then it is reused to remove contaminants from less pure extraction agent; this process continues until the strip acid is saturated with contaminants. The strip acid is then disposed of using conventional techniques.

A separate stripping test was performed to determine the efficiency of the strip acid process. In this test, the same quantity of acid was used repeatedly to regenerate previously used extractant. It was found that levels of iron in excess of 1000 ppm did not reduce the stripping efficiency as long as the acid strength of the strip acid was maintained at 35% by the addition of concentrated acid. This is due to the fact that the extractant transfers acid from a more concentrated stream (the strip acid) to a less concentrated stream (the battery fluid). The overall effect is that the iron in the strip acid is concentrated by a factor of 5-30 times as compared to waste battery fluid. Under these conditions, a two-stage cross flow technique is believed to function quite well to regenerate the extraction agent—fresh acid used to strip partially clean extraction agent in stage-two, and contaminated acid (e.g. strip acid too contaminated to continue to serve in stage-two) employed in stage-one to produce partially clean extraction agent for stage-two.

Since after each strip acid treatment of the extraction agent in the stripping process the contaminant level in the extractant is decreased and the contaminant level in the strip acid is increased, as is noted above, it may be desirable to fortify the strip acid with concentrated acid after each treatment. In this manner, the strip acid may be used repeatedly to remove additional contaminants from contaminated extraction agent.

While particular embodiments of the present invention have been disclosed herein, it is not intended to limit the invention to such a disclosure, and changes and modifications may be incorporated and embodied within the scope of the following claims.

What is claimed is:

1. A method for recycling contaminated sulfuric acid from lead acid batteries to reclaimed sulfuric acid fore reuse in said batteries by removing contaminating iron impurities, the steps which comprise:
    (a) diluting the contaminated sulfuric acid to a concentration between 150 and 230 grams per liter;
    (b) filtering the sulfuric acid through a first filter means to remove solid impurities;
    (c) adding an oxidizing agent to the sulfuric acid to assure that the iron contaminants are substantially in a ferric form;
    (d) removing the iron contaminants from the sulfuric acid through liquid-liquid extraction using an extraction agent comprising mixture of a mono- or di-alkyl phosphoric acid and a metal chelation collector selected from the group consisting of a 8-hydroxyquinoline substituted in the No. 7 position with a long chain aliphatic hydrocarbon radical and an oil-soluble 2-hydroxy benzophenoneoxime, a modifier which maintains solubility of the phosphoric acid and metal chelation collector and enhances phase disengagement, and a water immiscible carrier, the molar ratio of the 8-hydroxyquinoline and the phosphoric acid being between 1:1::1:4, respectively; wherein the ratio of extraction agent to water immiscible carrier is greater than 10:90;
    said extraction performed at a volumetric ratio between said sulfuric acid and said extraction agent of between 4:1::1:4, and repeated to reduce substantially the contaminating iron impurities;
    (e) filtering the product of step (d) through a carbon filter means to remove the residual extraction agent; and
    (f) adding concentrated sulfuric acid to return the sulfuric acid concentration of the product of step (e) to a sulfuric acid concentration for use in new lead acid batteries; and
    wherein the contaminating iron impurities are reduced to a level of no more than 20 parts per million in the final product of step (f).

2. A method of claim 1 wherein said organophosphoric acid comprises di-2-ethyl hexyl phosphoric acid.

3. A method of claim 1 wherein said modifier is selected from the group of alkyl phosphates and high molecular weight alcohols.

4. A method of claim 7 wherein said modifier is tridecanol.

5. A method of claim 1 wherein said water immiscible carrier comprises a hydrocarbon solvent in which both the chelating agent and the organophosphoric acid are soluble.

6. A method of claim 5 wherein said water immiscible carrier is odorless mineral spirits.

7. A method of claim 1 wherein said first filter means comprises a hydrolytic polypropylene plate.

8. A method of claim 1 wherein said carbon filter comprises a packed column of granular activated carbon.

9. A method of claim 1 wherein the contaminating elements are removed from the extraction agent by contacting said extraction agent with a strip acid with an acid concentration of between 30 and 50%.

10. A method of claim 9 wherein the contaminating elements are removed from said extractant by cross flow contact with the strip acid.

11. A method of claim 10 wherein said cross flow contact comprises repeatedly contacting the extraction agent with progressively purer strip acid until the contaminating elements are adequately removed from the extraction agent.

12. A method of claim 11 wherein after each treatment of the extraction agent with the strip acid, thereby decreasing the contaminant level in the extractant and increasing the contaminant level in the strip acid, the strip acid is fortified with concentrated acid and then employed again to remove contaminants from additional extraction agent containing contaminating elements.

13. A method of claim 1 wherein said derivative 8-hydroxyquinoline is a 7-[3-(5, 5, 6, 7-tetramethyl-1-octenyl)]-8-hydroxyquinoline.

14. A method in accordance with claim 1 wherein said dilution of the sulfuric acid comprises addition of water to achieve an acid concentration of substantially 15 to 18%.

15. A method for recycling contaminated sulfuric acid from lead acid batteries to reclaimed sulfuric acid for reuse in said batteries by removing contaminating iron impurities, the steps which comprise:
    (a) diluting the contaminated sulfuric acid to a concentration between 150 and 230 grams per liter;
    (b) filtering the sulfuric acid through a first filter means to remove solid impurities;
    (c) oxidizing the sulfuric acid to assure that the iron contaminants are substantially in a ferric form;
    (d) removing the iron contaminants from the sulfuric acid through liquid-liquid extraction using an extraction agent comprising mixture of a mono- or di-alkyl phosphoric acid and a metal chelation collector selected from the group consisting of a 8-hydroxyquinoline substituted in the No. 7 position with a long chain aliphatic hydrocarbon radical and an oil-soluble 2-hydroxy benzophenoneoxime, a modifier which maintains solubility of the phosphoric acid and the metal chelation collector and enhances phase disengagement, and a water immiscible carrier, the molar ratio of the 8-hydroxyquinoline and the phosphoric acid being between 1:1::1:4, respectively; wherein the ratio of extraction agent to water immiscible carrier is greater than 10:90;

said extraction performed at a volumetric ratio between said sulfuric acid and said extraction agent of between 4:1::1:4, and repeated until the contaminating iron impurities are substantially reduced;

(e) filtering the product of step (d) through a carbon filter means to remove the residual extraction agent;

(f) adding concentrated sulfuric acid to return the sulfuric acid concentration of the product of step (e) to a sulfuric acid concentration for use in new lead acid batteries, the final concentration of iron in the sulfuric acid being no more than 20 parts per million; and (g) removing the contaminating elements from the extraction agent by contacting said extraction agent with a strip acid with an acid concentration of between 30 and 50%.

16. A method of claim 15 wherein said derivative 8-hydroxyquinoline is a 7-[3-(5, 5, 6, 7-tetramethyl-1-octenyl)]-8-hydroxyquinoline.

17. A method of claim 16 wherein said modifier is selected from the group of alkyl phosphates and high molecular weight alcohols.

18. A method of claim 17 wherein said water immiscible carrier comprises a hydrocarbon solvent in which both the chelating agent and the organophosphoric acid are soluble.

19. A method of claim 15 wherein the contaminating elements are removed form said extractant by cross flow contact with the strip acid.

20. A method of claim 19 wherein said cross flow contact comprising repeatedly contacting the extraction agent with progressively purer strip acid until the contaminating elements are adequately removed from the extraction agent.

21. A method of claim 20 wherein after each treatment of the extraction agent with the strip acid the strip acid is fortified with concentrated acid and then employed again to remove contaminants from additional extraction agent containing contaminating elements.

* * * * *

UNITED STATES PATENT AND TRADEMARK OFFICE
CERTIFICATE OF CORRECTION

PATENT NO. : 4,971,780
DATED : November 20, 1990
INVENTOR(S) : Robert A. Spitz

It is certified that error appears in the above-identified patent and that said Letters Patent is hereby corrected as shown below:

Column 1, line 26 - "non-meta" should be --non-metal--

Column 7, line 36 - "fore" should be --for--

Column 8, line 13 - claim "7" should be claim --3--

Signed and Sealed this

Twenty-eighth Day of April, 1992

Attest:

HARRY F. MANBECK, JR.

*Attesting Officer*    *Commissioner of Patents and Trademarks*